(12) United States Patent
Finnerty et al.

(10) Patent No.: US 12,338,840 B1
(45) Date of Patent: Jun. 24, 2025

(54) BLOWER AND AIR FILTER ASSEMBLY (71) Applicant: WATT FUEL CELL CORP., Mt. Pleasant (PA)

(72) Inventors: Caine M. Finnerty, Mount Pleasant, PA (US); Paul Dewald, Scottdale, PA (US); Mathew Isenberg, North Canton, OH (US)

(73) Assignee: Watt Fuel Cell Corp., Mt. Pleasant, PA (US)

( * ) Notice: Subject to any disclaimer, the term of this patent is extended or adjusted under 35 U.S.C. 154(b) by 0 days.

(21) Appl. No.: 18/848,235

(22) PCT Filed: Jan. 30, 2023

(86) PCT No.: PCT/US2023/011825
§ 371 (c)(1),
(2) Date: Sep. 18, 2024

(87) PCT Pub. No.: WO2023/219664
PCT Pub. Date: Nov. 16, 2023

Related U.S. Application Data

(60) Provisional application No. 63/340,570, filed on May 11, 2022.

(51) Int. Cl.
*F04D 29/70* (2006.01)
*F04D 17/16* (2006.01)
(Continued)

(52) U.S. Cl.
CPC ........... *F04D 29/703* (2013.01); *F04D 17/16* (2013.01); *F04D 25/0693* (2013.01);
(Continued)

(58) Field of Classification Search
CPC .... F04D 25/166; F04D 29/281; F04D 29/703; F04D 17/16; F04D 25/0693;
(Continued)

(56) References Cited

U.S. PATENT DOCUMENTS 9,017,893 B2    4/2015   Dewald et al.
9,512,846 B2   12/2016   Dewald et al.
(Continued)

FOREIGN PATENT DOCUMENTS

JP    2004068724 A    3/2004
WO   2016148681 A1    9/2016

OTHER PUBLICATIONS

International Search Report and Written Opinion from International Application No. PCT/US2023/011825 mailed Nov. 16, 2023.

*Primary Examiner* — Courtney D Heinle
*Assistant Examiner* — Andrew Thanh Bui
(74) *Attorney, Agent, or Firm* — Dilworth & Barrese, LLP (57) ABSTRACT

The outlet of a blower extends through a hole in a circuit board to which the blower is attached. Electronics on the board control operation of the blower. The blower can be configured as two blowers in series, to provide more precise control of airflow. An air filter, such as an N95 filter is releasably attached to the blower intake on a front side of the circuit board. The front side of the board can be attached to a support panel, with a gap therebetween, and the air filter facing and in fluid communication with the gap. An air filter gasket is positioned around the edges of the front side of the circuit board, such that air sucked through the air filter over the intake of the blower, first passes through the air filter gasket between the circuit board and the support panel. The air filter gasket can be coarser than the air filter. The blower is well suited for use in a fuel cell apparatus, for supplying an electronically controlled airflow to the fuel cell.

19 Claims, 10 Drawing Sheets

(51) Int. Cl.
   *F04D 25/06*      (2006.01)
   *F04D 29/42*      (2006.01)
   *F04D 29/58*      (2006.01)
   *H01M 8/04089*    (2016.01)

(52) U.S. Cl.
   CPC ..... *F04D 29/4226* (2013.01); *F04D 29/5813* (2013.01); *H01M 8/04089* (2013.01)

(58) Field of Classification Search
   CPC ............ F04D 29/4226; F04D 29/5813; H01M 8/04089; H01M 2008/1293; H01M 8/004; H01M 8/12; H01M 8/04; H01M 8/04746; H01M 8/04776
   See application file for complete search history.

(56) References Cited

U.S. PATENT DOCUMENTS

| | | |
|---|---|---|
| 9,593,686 B2 | 3/2017 | Dewald et al. |
| 9,627,700 B2 | 4/2017 | Finnerty et al. |
| 9,627,701 B2 | 4/2017 | Finnerty et al. |
| 2015/0086810 A1 | 3/2015 | Grange et al. |
| 2019/0234425 A1 | 8/2019 | Miyasaka |
| 2020/0277961 A1 | 9/2020 | Finnerty et al. |
| 2021/0167404 A1 | 6/2021 | Finnerty et al. |
| 2023/0223811 A1* | 7/2023 | Becker .................. F04D 25/06 417/423.14 |

\* cited by examiner

BLOWER AND AIR FILTER ASSEMBLY

CROSS-REFERENCE TO RELATED APPLICATIONS

This application claims priority to U.S. Provisional Application No. 63/340,570 filed on May 11, 2022, the entire contents of which are incorporated herein by reference.

FIELD OF THE INVENTION

The invention relates to an assembly of a blower having an air filter, with a circuit board, and more particularly to an assembly for a filtered air blower with a circuit board having electronics to control the blower for use in a fuel processing apparatus, such as a fuel reformer, fuel cell assembly, fuel combustor and the like, in need of a well-controlled flow of filtered air or other oxygen containing gas. As used herein, the term air, will include oxygen enriched air or nitrogen or otherwise oxygen diluted air.

BACKGROUND OF THE INVENTION

Exothermic mechanisms, such as catalytic oxidation, combustion, fuel reformation or fuel cell devices, are often controlled with various electronic systems. Under circumstances, a precisely controlled flow of air is needed to regulate oxygen levels of chemical or electrochemical reactions, to properly control the reactions. Often gas flow valves and blower speeds need to be electronically controlled to regulate a chemical reaction properly. It can be important to shield the electronics from the heat given off by these mechanisms. It can also be important to filter the air being fed to the reactor.

Internal combustion engines, fuel cells and fuel reformers produce a considerable amount of heat. This can present a difficulty when trying to locate these mechanisms in close proximity to individuals, or within a dwelling, office or other inhabited structure. This can also present difficulties when trying to provide a compact device within a compact housing, wherein portions of the mechanism, such as electronic controls, including airflow control electronics must be in close proximately to an exothermic reaction, yet insulated thermally from the exothermic reactions.

Fuel consuming devices can require precise airflows to insure that the oxidation of the fuel proceeds in a well-controlled manner. For example, blowers for supplying air to these devices are often controlled by electronics, that receive information from sensors, monitoring devices, and the like. Some of these electronics and other of such Balance of Plant (BOP) components need to be protected from the heat given off by the exothermic reactions they are controlling and/or monitoring.

The constructions of conventional heat producing mechanisms, such as internal combustion engines, fuel cells and fuel reformers have presented additional difficulties, which make it difficult to integrate these mechanisms into an inhabited environment and or locate these mechanisms in compact housings. The need to protect electronics and other components from heat given off by the devices can complicate efforts to construct the apparatus in a compact manner, if too much space is taken up by physical separations of the components and electronics from the heat producing elements.

Air blowers can be useful in providing air as a source of oxygen to fuel consuming devices. Some blowers are provided with air filters. However, these filters tend to be bulky and interfere with compact constructions. It can also be inconvenient to replace these filters, and some are not adequate to protect internal electronics from dust, moisture, impurity droplets, and the like. Many fuel cell assemblies and reformers utilize ambient air as a source of oxygen for the electrical and chemical reactions occurring therein, as well as for temperature control within the units. Ambient air often includes particulates (e.g., dirt/dust), contaminants (e.g. sulfur, hydrocarbons), and/or moisture, each of which can damage the fuel cell and reformer units. Unfortunately, existing filtration systems have not proved to be adequate for use with these systems.

Accordingly, it is desirable to provide improved structures for a heat producing mechanisms that overcomes drawbacks of the prior art.

SUMMARY OF THE INVENTION

Generally speaking, in accordance with the invention, an apparatus has at least two zones, each thermally isolated from the other. An airstream of ambient air from an air intake of the apparatus can be used to keep these zones at different temperatures, such as one or more cool zones and one or more hot zones at temperatures above the temperatures of the cool zones. Preferably, the cool zones are appropriate for electronic components. In one embodiment of the invention, the airstream passes around the outside of the exothermic reactor or other exothermic device to thermally isolate the outside surface of the outside apparatus housing from the exothermic device contained therein. In another embodiment of the invention, the airstream of the air intake is used to cool the temperature of one, two or more cool zones of the apparatus so that heat sensitive components, such as electronics, are not damaged from heat produced by exothermic devices.

In one embodiment of the invention, the apparatus includes a heat producing mechanism, such as a fuel combustor, a fuel reformer, a fuel cell, or a fuel cell stack. Fuel cell systems in accordance with the invention can include a fuel reforming section integrated with an electricity producing section, integrated into a single fuel cell structure. An airstream from an air intake can be used as the oxygen source of the heat producing mechanism. This airstream can be used to help keep zones thermally cool, despite what may be a close proximity to from the heat of the exothermic mechanism. For example, a stream of ambient air can be blown or drawn over various components of the mechanism, such as electronic components, to keep those components cool. The intake air stream can also thermally isolate the outside surface of the device from the heat produced therein. This can be accomplished by drawing the intake air around the outside of the exothermic elements. This airstream can also be blown or drawn over any electronics or other elements that need to be kept cool. This air can then flow into the device to serve as the source of oxygen for any chemical reactions therein.

In preferred embodiments of the invention, the exothermic mechanism can be enclosed within a double wall enclosure of a housing for the overall apparatus. The interior space between the outer and inner walls of the housing can act as an air intake conduit, which can function as a tube-within-a-tube construction. An array of fins can extend across the gap between the outer and inner walls, to transform this construction into an assembly of intake tubes around the entire length of the exothermic mechanism. This intake airstream can also be drawn or blown through one or more interior cool zones or sub-zones of the apparatus and then fed into the exothermic section of the mechanism as the source of air and/or oxygen. Any hot exhaust and excess intake air not required for the exothermic reactions can be fed directly outside the housing and can be piped away to a convenient exhaust location. Accordingly, if the air intake is on a rear end of the device, the cool ambient air can be drawn in and drawn around the entire top and/or bottom and/or sides of the device, including the cool open spaces of the interior thereof. At least a portion of the intake air can then be fed into the exothermic hot section and the exhaust can be emitted out from the rear end. The intake and exhaust can be side-by-side or concentric. For example, the intake can surround the exhaust.

In preferred embodiments of the invention, a housing for the device has a double wall construction, with both an inlet and an outlet at the rear end. The heat generating mechanisms are mounted on a platform and can be slid in and out of a front end of the housing. A blower can be positioned at the front end. The blower can draw cooling air into the rear end of the housing, around the length of the device through the double wall air passageway, and into a front interior cool zone of the housing. The interior zone at the front end of the housing can serve as a cool zone, where at least some of the electronics and other elements that need to be kept cool can be mounted. After passing around the outside of the exothermic device and through the cool zone, at least a portion of the stream of intake air can be received into the exothermic mechanisms and a hot exhaust and excess intake air not required by the exothermic device can be exhausted outside the apparatus.

In accordance with the present invention, there is provided a blower apparatus comprising a blower unit having a blower casing having an axial inlet and a radial outlet. An impeller is disposed within the casing for drawing a gaseous medium (e.g., air) at a first pressure into the axial inlet and expelling the gaseous medium at a second higher pressure through the radial outlet. A motor is provided for driving the impeller. The blower also includes an air intake assembly. A casing has an air inlet and an air outlet. The air outlet is connected to the axial inlet of the blower casing of the blower unit. A check valve can be mounted within the casing, positioned to permit airflow from the air inlet through to the air outlet and prevent airflow from the air outlet to pass back to the air inlet.

It can be advantageous to filter the incoming air before the air enters the blower intake, to filter particulates, volatile compounds, sulfur compounds, hydrocarbons, impurities and the like from environment, and/or to reduce moisture. The check valve prevents zero flow conditions from resulting in back flow from fans and other process air. The filter can be reticulated foam (low pressure drops) of some kind and potentially doped with specific materials to perform the tasks enumerated above. In a preferred embodiment of the invention, the filter can satisfy N95 certification standards. In preferred embodiments of the invention, a standard off the shelf N95 mask filter can be employed, eliminating the need for custom production. In other embodiments, a custom N95 capable filter is used. The filter can have two layers and a construction to keep the inner surfaces of the two layers separated for increased filter surface area and therefore, higher filtration airflow. The check valve can be a soft elastomer that induces very little pressure drop to open and uses the slight inherent stiffness and spring constant of the material to close and seal.

The blowers feeding air into the exothermic devices are advantageously constructed as two stage blowers assembled in series. Utilizing a system of linked, multiple blowers in accordance with this invention can be useful to achieve the gas flow requirements of a fuel cell or other sensitive exothermic mechanism. A dual-blower can help enable the system to benefit from both low inertia impellers for control as well as low drive motor rpm and power draw to provide required gas flow and pressure.

Fuel cell blower and fuel reformer blower assemblies are described in, e.g., U.S. Pat. Nos. 9,017,893; 9,593,686 and 9,512,846. The entire contents of each of these patents are incorporated herein by reference. Additional fuel cell-blower assemblies featuring an arrangement of multiple centrifugal blowers are described in, e.g., International Application No. PCT/US2012/020707, filed Mar. 16, 2015, and International Publication No. WO/2016/148681, published Sep. 22, 2016, the entire contents of each of which are incorporated herein by reference.

A centrifugal blower in accordance with the present invention can comprise a blower unit having a blower casing with an axial inlet and a radial outlet. An impeller can be disposed within the casing for drawing a gaseous medium at a first pressure into the axial inlet and expelling the gaseous medium at a second higher pressure through the radial outlet. A motor is provided within the housing for driving the impeller. The air intake assembly of the blower comprises an air intake casing having an air inlet and an air outlet. The air outlet is coupled to the axial inlet of the blower casing of the blower unit. A check valve is advantageously mounted within the casing, positioned to permit air flow from the air inlet to the air outlet and prevent air flow from the air outlet through to the air inlet.

A preferred blower system comprises a series of blower units. Each blower unit in the series comprises a blower unit casing having an axial inlet and a radial outlet, an impeller, and a motor for driving the impeller. A duct connects the radial outlet of a first blower unit in the series with the axial inlet of at least a second blower unit. An air intake assembly for the blower assembly comprises an air intake assembly casing having an air inlet and an air outlet. The air outlet is connectable to the axial inlet of the blower unit casing of a first blower unit of the series of blower units. A check valve should be mounted within the air intake assembly casing, adapted and positioned to permit air flow from the air inlet to the outlet, but prevent airflow from the air outlet to the air inlet.

The air intake assembly for the centrifugal blower system herein offers several advantages as compared to single stage blowers. The blowers include a filter of the incoming air before the check valve, to e.g., filter particulates, volatile compounds, sulfur compounds and other impurities that may be present in ambient air. The filter can also include a desiccant to reduce moisture.

Check valves in accordance with the invention can prevent zero flow conditions from permitting back flow from air forced to the proximity of the blowers from intake fans and other air processes. High temperature backflow can damage a solid oxide fuel cell (SOFC) and catalysts by oxidation. The present invention can prevent this from occurring.

Utilizing the multiple blower system of this invention for meeting the gas flow requirements of a fuel cell or other exothermic device enables the system to benefit from both low inertia impellers for control as well as low drive motor rpm and power draw to provide required gas flow and pressure. Thus, this integrated/interconnected arrangement of multiple centrifugal blowers inherently possessing smaller inertial forces than a single, larger centrifugal blower of comparable gas flow capability, the centrifugal blower system herein provides improved response times and control over a broad range of gas pressure and gas flow requirements than that of a single centrifugal blower unit. Fuel cell-blower assemblies featuring this arrangement of multiple centrifugal blowers are described in, e.g., U.S. Pat. Nos. 9,017,893; 9,593,686 and 9,512,846, the entire contents of each of which are incorporated by reference herein. Additional fuel cell-blower assemblies featuring this arrangement of multiple centrifugal blowers are described in, e.g., International Application No. PCT/US2012/020707, filed Mar. 16, 2015, and International Publication No. WO/2016/148681, published Sep. 22, 2016, the entire contents of each of which are incorporated by reference herein.

It can be particularly advantageous to filter the air entering a fuel consuming apparatus, such as a fuel reformer or a fuel cell. In preferred embodiments of the invention, air blowers are in fluid communication with intake air. The blowers comprise a housing having an axial intake and a radial output. The intake can include an attachment mechanism and a filter having an attachment portion designed to mate and engage with the attachment mechanism of the housing can provide a releasable attachment mechanism for installing a filter over the air intake of the blowers.

Filters in accordance with the invention can advantageously satisfy N95 standards. For improved surface area and therefore improved filtration and airflow, the filters should be dual layer filters, with internal constructions to keep the layers separated, with the entire outer surface available for air filtration.

Flow control electronics preferably measure airflow resistance through the blowers, to determine whether the filters need to be changed. In preferred embodiments of the invention, the filters can be screwed on and off the intake of the blowers, for convenient replacement and secure, well-sealed attachment.

In preferred embodiments of the invention, the blower (including dual impeller blowers) is mounted to the same circuit board that controls the blower operation. For example, the circuit board can have a hole, the nominal outer diameter of the air intake. The blower can be mounted on a front side of the circuit board and the intake can extend through the hole to a rear side of the board. The front side can have most or all the circuits and chips. The filter can be attached to the intake, on the rear side of the board, e.g., the top side.

The rear (bottom) side of the board, with the exposed filter can be mounted on a support panel within a cool zone of the apparatus or a hot sub-zone at a temperature low enough for the control electronics. A gasket, such as one formed of air filter material can be sandwiched between the outer edges of the rear side of the circuit board and the support panel to provide air flow separation between the board and panel. As the blower operates, it draws air into the gap between the circuit board and the support panel, through the air filter gasket, through the filter, then into the exothermic device. This helps keep the board cool. The filter gasket can trap impurities and help prevent the blower filter from becoming clogged.

By adjusting the dimensions of the double wall air conduit, and/or the clearance around the circuit board with the intake blower thereon, the air flow through the air intake conduit of the outer housing and the airflow over the circuit board attached to the blower can have a high velocity and provide a high-efficiency cooling system to insulate the exothermic elements from the outside of the device and/or heat sensitive components in the cool zone(s). Therefore, the device can be located in close proximity to individuals in the vicinity of the device and internal electronics can be protected. Also, the device can be relatively compact. Any electronics or other elements for the device can be kept cool in a cool zone, without requiring large physical separations.

Fuel cell system in accordance with the invention can be wired to power a home, R/V or other dwelling. The overall dimensions can be relatively small, 6-24"×6-24"×12-36", with an overall length of under 4 feet preferred, as is an overall length over 6" preferred. Fuel lines for providing reformable fuels should also be included. If liquid fuel is to be used, a vaporizer to vaporize the liquid fuel is useful.

The fuel cell, blowers, circuit boards and filters can all be mounted on a platform that can be slid out of a housing. The electrical connection to the dwelling and the like can be maintained, even when the internal components on the platform are slid out for service.

Other advantages and objects of the invention will be apparent from the drawings and descriptions to follow.

BRIEF DESCRIPTION OF THE DRAWINGS

The following drawings are presented for illustration only, and should not be considered to limit the scope of the invention. The drawings are proportional, but other proportions are also acceptable, within the spirit and scope of the invention.

DETAILED DESCRIPTION OF THE PREFERRED EMBODIMENTS

The present disclosure may be understood more readily by reference to the following detailed description of the disclosure, taken in connection with the accompanying figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

The invention relates to exothermic mechanisms. Examples include catalytic fuel oxidizers or reformers, fuel cell systems, fuel-consuming apparatuses, fuel-processing apparatuses, and other heat generating apparatuses. The term exothermic mechanism, apparatus or device can encompass any exothermic apparatus based on any kind of fuel, including the apparatuses described in Ser. No. 17/267,095, filed Feb. 9, 2021, as well as in U.S. Pat. Nos. 9,627,700 and 9,627,701. The contents of this application and these patents are incorporated herein by reference. Heat generating and/or exothermic apparatuses include electric generators, fuel reformers, internal combustion engines, fuel cell systems, and the like. The expression fuel, shall be understood to include both liquid fuels and gaseous fuels, including a vaporized liquid fuels. The term fuel cell will include integrated apparatuses that reform the fuel and produce electricity in an integrated device.

As used herein, the term fuel cell stack can include a plurality of assembled fuel cells. Each fuel cell may generate electricity, in the form of direct current from electro-chemical reactions taking place therein. The individual fuel cells can be combined into a stack and the balance-of-plant (BOP) components can include various systems and structures for the generation of electric power, including fuel reformers, chemical reactors, gaskets, pumps, sensors, vaporizers, heat exchangers, fuel lines, blowers, switches, relays, thermistor's, thermocouples, conduits, control electronics, and the like.

Examples of heat generating apparatuses in accordance with the invention include those described in U.S. Pat. Nos. 9,627,700 and 9,627,701. The entire contents of these patents are incorporated herein by reference. Fuel reformers in accordance with the invention can be configured to supply reformate, such as hydrogen-rich reformate to a fuel cell stack. The fuel cell stack may operate at a relatively high temperature for maximizing electric power generation. Furthermore, a sufficient amount of airflow can be required for the fuel cell stack and/or the BOP components. A portion of or all the air flow may be mixed with the fuel to provide, for example, a fuel-air mixture and hydrogen rich reformate. The airflow can also be used for the purpose of diluting the fuel, to control the intensity of the chemical reactions. In addition, other electronic components of the fuel cell system can serve as heat generation sources, that are required to be cooled down for proper operation.

Accordingly, there may exist various thermal zones and thermal sub-zones of those zones, that need to be maintained at different temperatures, depending on the types and functions of the individual components therein.

As used herein, the terms hot zone and cold or cool zone are relative in nature. For example, a cold or cool zone could be well above room temperature, but below the temperature of the hot zone. In addition, the hot zone(s) and the cool zone(s) can include various sub-zones of different relative temperatures.

A heat generating apparatus in accordance with preferred embodiments of the invention can include a low temperature thermal zone and a high temperature thermal zone. A heat insulating wall can be located at the interface of the two zones. The low temperature (cool) thermal zone can be in fluid communication with an air inlet, wherein a stream of ambient air is drawn into the apparatus. The high temperature (hot) thermal zone includes a heat generating device, such as a fuel reformer, fuel cell, internal combustion engine and the like. The two zones can be separated with a heat insulating wall. A main air blower can be present at the interface of the two zones. The main air blower can draw ambient air into the low temperature zone and maintain the low temperature of the cool zone by the constant flow of ambient air. The blower can then blow this air directly or indirectly into the hot zone, as required for proper operation of the exothermic reaction therein. For example, a sub-zone can be located between the main blower and the hot zone and the air for the heat generating device can be drawn from the sub-zone.

Ambient air can include undesirable particulates, contaminants, and/or moisture that can affect the proper operation of the fuel cell assemblies and/or reformers. These particulates or contaminants can include sulfur or hydrocarbons, and/or moisture, which can damage the fuel cell and reformer units. This damage can be in the form of oxidation to the internal components, hot spots from accumulating particulates, or rapid cooling that can cause structural defects in the components, among others.

The components of the fuel cell assemblies are designed to maintain their mechanical, chemical, and/or electrical integrity during start up and normal operating modes as exposed to the high operating temperatures. During cooldown periods, e.g., transitioning into a low power mode or power down procedure, problems can arise. For example, when the system is cooling down, the air inside a fuel cell assembly can condense and create a vacuum in the fuel cell assembly that can continue to draw outside air in through an air inlet and/or exhaust. The exposure of the fuel cell assembly to this additional outside air can result in damaging oxidation or structural integrity of the fuel cell stack. The check valves and filters described herein can help prevent these problems.

Apparatuses in accordance with the invention can be constructed with the heat generating device mounted on a platform, with a housing surrounding the platform. The housing can have a two-layer dual wall, with an air intake conduit therebetween. The inner and outer layers of the two-layer wall can be segmented by a plurality of fins, running the length of the walls, to create a plurality of air passageway tube structures along the length of the two-layer wall and increase the efficiency of air flow.

An ambient air inlet can be present at a rear end of the housing and an air blower can be present inside a front end of the housing. Thus, the air can be sucked into the inlet and flow through the housing, around the outside of the entire apparatus to the front region thereof. This can create a cool zone around the outside surface of the apparatus. The rear end can also contain a cool zone, where the ambient air is drawn in. The front end can also contain a cool zone, as the ambient air flows from the air passageway to an open front end of the housing. Consequently, the cool zone can be air-flow isolated from the hot zone, across the air blower. Thus, components that need to be cool, such as electronic components, can be mounted in the cool zone (front, rear or bottom) and the outer surface of the apparatus can be kept at a relatively cool temperature.

In one embodiment of the invention, the apparatus includes a fuel cell system, with one or more fuel-processing components. These one or more fuel-processing components can include one or more balance-of-plant (BOP) components configured to supply reformate fuel mixed with air to a fuel reforming portion of a fuel cell stack. The fuel cell stack can be configured to generate electric power based on the reformate provided from reforming section. Electronically controlled blowers can be located in an airflow control zone. These blowers control the precise flow of air to the fuel cell components. These blowers can be located in a flow control zone, kept cool by the flow of ambient air therein. Any excess air blown into this flow control zone can be vented out the apparatus exhaust.

In one embodiment of the invention, the BOP components can include a flow switch unit, configured to regulate blower speeds and be shut off when air flow does not meet a preset requirement. Air flow can be measured by a flow switch unit. Air flow at one or more of the blowers can also be adjusted to maintain proper performance of the apparatus, when air flow amounts meet preset requirements. In one embodiment of the invention, an air flow switch unit can include a flat upper or differential pressure switch. A blower, preferably a dual blower that can be electronically controlled to operate at different speeds can be employed to adjust the flow of air as needed. These flow control blowers of the BOP components can be mounted in a flow control cool zone, wherein a flow of air to the flow control zone keeps the zone at a cool temperature in order to help protect any electronic components of the flow control system.

A housing for the apparatus can include thermal separation walls, formed of thermal insulation material, to separate the hot and cool zones and sub-zones. In addition, the cool zone(s) or the hot zone(s) can be separated into different sub-zones, maintained at different temperatures relative to each other.

In one embodiment of the invention, the fuel cell system and one or more fuel-processing components can include one or more BOP components configured to supply reformate to a fuel cell stack. The fuel cell stack can be configured to generate electric power based on the reformate provided from the one or more BOP components. The fuel cell stack can be located in a first hot sub-zone and the BOP components can be provided in a second hot sub-zone at a temperature cooler than the first hot sub-zone.

In one embodiment of the invention, the air inlet port can be positioned at the front end of the housing and configured to draw ambient air into the cool zone. The hot zone can include a hot zone exhaust, exhausting hot gases created by the exothermic reactions therein. The hot zone exhaust can also be located at the front of the housing. The exhaust and the inlet can be concentric. In one embodiment of the invention, the exhaust port is surrounded by the air inlet port. The exhaust and inlet can also be side-by-side at the rear of the apparatus.

In operation, the main blower can draw air in through the inlet, into a rear end interior open space defined by the housing, through the housing wall air conduit around the outside of the housing, and into an open front end interior space of the housing. The blower can then blow the air into the hot zone, or a hot or cool sub-zone, such as a flow control zone with electronically controlled blower systems for delivering an electronically controlled amount of air to an oxygen consuming exothermic device such as into a fuel cell, fuel reformation, processing or combustion apparatus. The blower can also blow the intake air into a flow control cool zone, controlling the precise flow of air to the fuel consumption/combustion/reforming device. Hot exhaust gases exit through a hot zone exhaust port. The electronic components can be located in the cool zones and the exothermic components can be located in the hot zones of the apparatus, with the cool zones in fluid communication with the ambient intake air inlet, upstream from the hot zone(s). The hot zone can be in downstream from the air blowers, and in fluid communication with the exhaust port. In one embodiment of the invention, the hot zone can be fully enclosed at the front, sides and/or rear, by at least one of the cool zones, except that the exhaust port.

Figure 1:
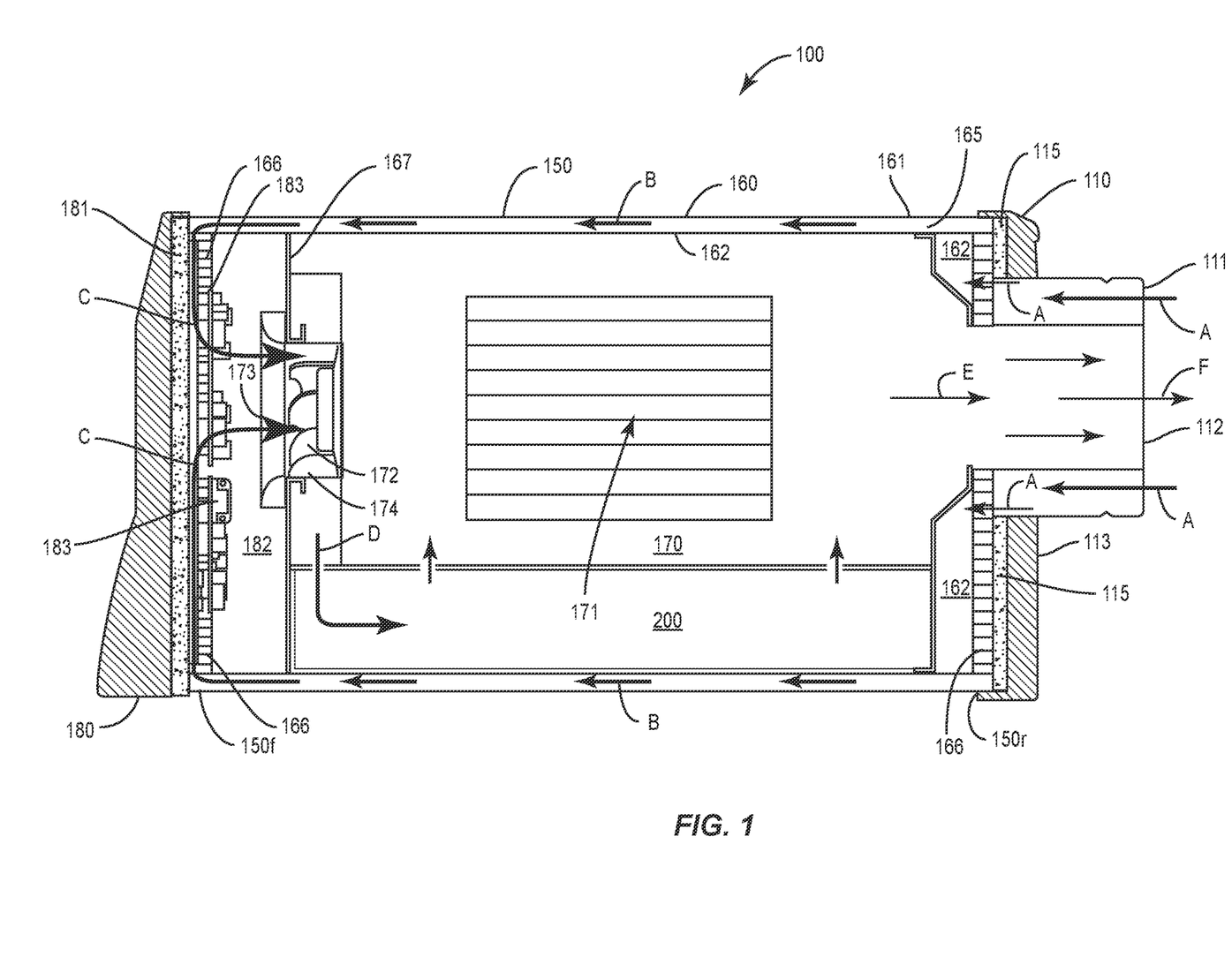
FIG. 1 is a schematic side cross-sectional view of an exothermic apparatus in accordance with preferred embodiments of the invention.

One preferred embodiment of an exothermic fuel consuming device constructed in accordance with the invention is shown generally in FIG. 1, as fuel cell 100. Fuel cell 100 includes a rear end 110, a midsection 150, and a front end at front end cap 180. Midsection 150 extends from a midsection front 150$f$ to a midsection rear 150$r$ thereof. Midsection rear 150$r$ of midsection 150 is located at rear end 110 of reformer 100. Midsection front 150$f$ of midsection 150 is located at front cap 180 of reformer 100. Reformer rear end 110 includes an inlet 111 concentric with an outlet 112, formed through a rear cap 113. Midsection 150 includes a housing cover 160 around a fuel cell 171, mounted within a hot zone 170, kept hot from the heat given off by exothermic fuel cell 171. Fuel cell 171 includes an array of fuel reforming reactors at an anode end thereof, generating a hydrogen rich reformate and a cathode end, where electricity is produced from the reformate, a blower 172 for sucking air into inlet 111, and an electronics assembly 183 mounted in a cool zone 182 within front cap 183. Front cap 183 can be removably held firmly to midsection front 150$f$ with bolts.

Flow control blowers and electronic systems for regulating the precise flow of air into fuel cell 171 by controlling the speed of these flow control blowers can be mounted in a cool temperature flow control zone 200. Fuel cell 171, blower 172, electronics 183, and the systems (discussed below) of flow control zone 200 can all be mounted together on a mounting platform as a unit, which can be slid into and out of housing front end cap 180 for maintenance, service or parts replacement. Fuel cell system 100 can remain electrically connected to a recipient of the electricity produced thereby.

Housing cover 160 is formed with an outer wall 161 and an inner wall 162. An intake airflow housing conduit 165 is formed between outer wall 161 and inner wall 162. An array of fins 166 extend from an inner surface of outer wall 161, into housing conduit 165, to inner wall 162 and form an array of tubular conduits along the inner surface of outer wall 161.

Inner wall 162 is shorter than outer wall 161. Therefore, housing conduit 165 is exposed at rear end 150$r$ and rear end 150$r$ of midsection 150. A gasket 115 is present around the outside rim of an inner surface of rear cap 113. Rear end 150$r$ of midsection 150 is pressed into gasket 115. Because inner wall 162 of midsection 150 is shorter than outer wall 161 and fins 166, interior conduit 165 is accessible at rear end 150$r$ of midsection 150. Similarly, a gasket 181 is present around the outside rim of an inner surface of front cap 180. Thus, interior conduit 165 is also accessible at front end 150$f$. Consequently, an interior space is created inside rear cap 113 and front cap 180. These interior spaces are in fluid communication with housing conduit 165.

Air inlet 111 is in fluid communication with the interior defined by rear cap 113/front end 110. However, outlet 112 is sealed from the interior of front cap 113. Therefore, any air entering inlet 111 enters the interior of front cap 113, which is in fluid communication with housing conduit 165 at rear end 150r of midsection 150. Housing conduit 165 is in fluid communication with a front interior 182 enclosed by front cap 180 at front end 150f of midsection 150. An inlet end 173 of blower 172 is in fluid communication with interior 182 of front cap 180. A radial outlet 174 of blower 172 is in fluid communication with fuel cell 171. Thus, as blower 172 operates, it draws air into inlet 111 in the direction of an arrow A, along housing conduit 165 in the direction of arrow B, and then into rear interior 182, in the direction of arrow C. An assembly of electronics 183 are mounted in rear interior 182. Thus, intake air blows over electronics 183 upstream of and prior to entering fuel cell 171, to keep electronics 183 cool in an electronics cool zone.

By virtue of intake air flowing along the outside of fuel cell 100 and into interior 182 of front end cap 180, a cool zone is formed on the outside of fuel cell 100 and at front interior 182. Therefore, the outside surface of fuel cell 100 and front interior 182, containing electronics 183 and other elements that need to be kept cool can be provided. An insulating wall 167 is provided at the rear end of electronics cool zone 182. Blower 172 is mounted on insulating wall 167. Together, wall 167 and blower 172, as well as intake air flowing through conduit 165 help isolate the exothermic portions of fuel cell 100.

Blower 172 can direct the intake air into a flow control region 200 in the direction of arrow D. At least some of the air from flow control zone 200 flows to hot zone 170 and some is blown directly into fuel cell 171, where it takes part in an exothermic reaction, producing a hot exhaust gas stream, traveling in the direction of arrows E. The exhaust stream and hot air warmed from the heat of exotherm of fuel cell 171 then exit exhaust 112 of fuel cell 100 in the direction of arrow F. Exhaust 112 can be elongated, so as to transport hot exhaust gases to an appropriate chimney, flue or other structure. However, because exhaust 112 is concentric within intake 111, the intake air helps isolate this heat.

Cool flow control zone 200 is in fluid communication with ambient air drawn in by blower 172. Controlled blowers in flow control zone 200 regulate the precise amount of air entering fuel cell 171. Excess air can flow around fuel cell 171.

Figure 2:
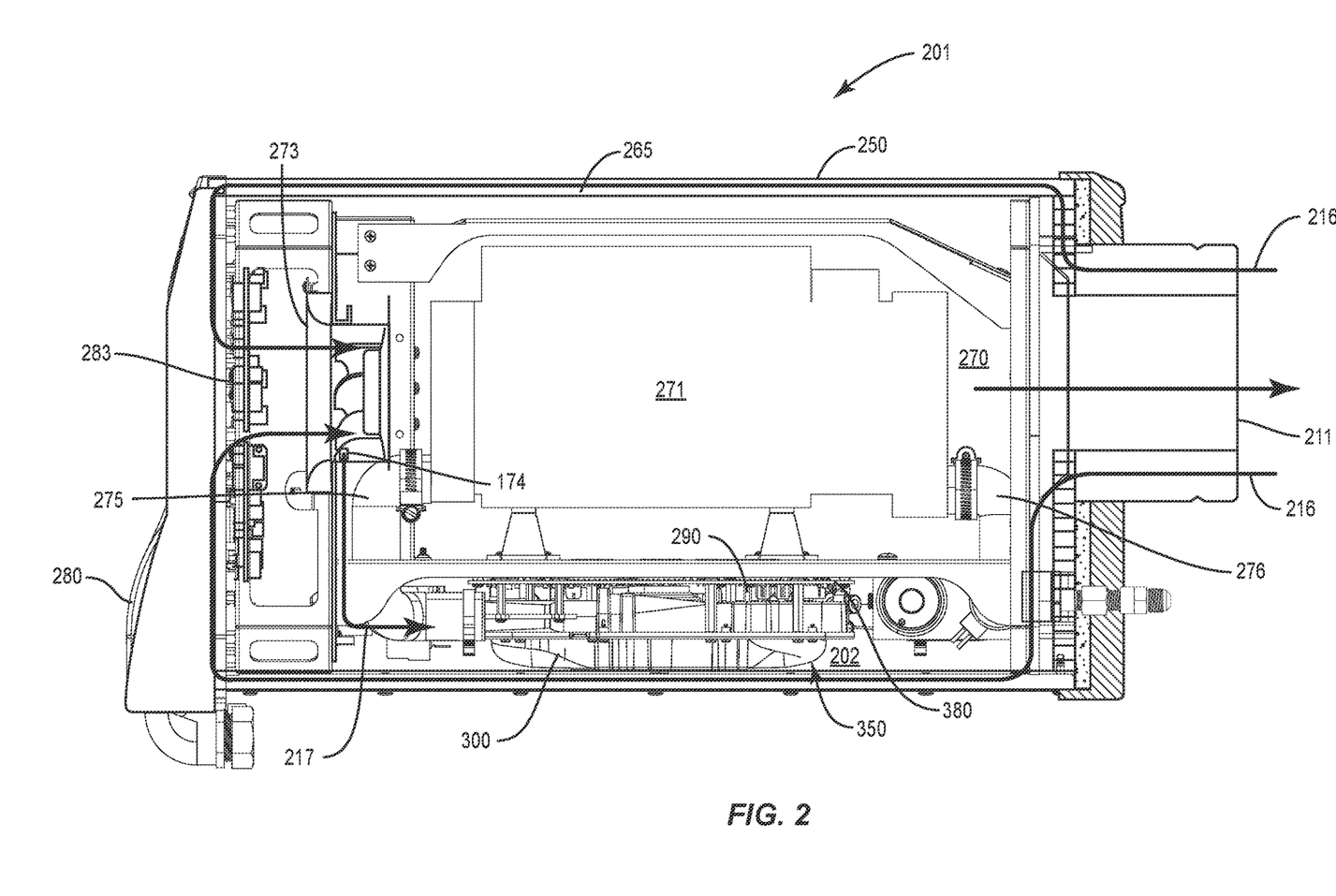
FIG. 2 is a side cross-sectional view of an integrated fuel reformer and fuel cell apparatus in accordance with preferred embodiments of the invention.

A fuel cell apparatus with a combined fuel reformer and fuel cell stack is shown generally as exothermic apparatus 201 in FIG. 2. A stream of ambient temperature intake air 216 enters apparatus 201 through an intake 211. Intake air 216 flows along a conduit 265 formed by a double wall outer housing 250, similar to the housing of reformer 100. Intake air 216 is drawn into apparatus 201 by a main blower 273. An open front recess 282 is located at a front end of apparatus 201, defined by a removable front cap 280. Front cap 280 is held securely against conduit 265 with bolts. An assembly of electronics 283 is mounted in rear recess 282. Intake air 216 can be directed to below over the rear end of electronics 283, past a front side of electronics 283, or both.

Apparatus 201 includes an integrated fuel reformer and fuel cell 271. The fuel reformer portion receives a flow of fuel from a fuel line and a flow of air through a reformer intake hose 276. The fuel cell portion producing electricity from the reformate receives a flow of air from a fuel cell hose 275. The flow of air from hoses 275 and 276 is controlled by an assembly of flow control electronics 290. Flow control electronics 290 control a flow of air from a fuel cell blower assembly 350. Flow control electronics 290 and blowers 300 are located in a flow control zone 202, located below a hot zone 270 housing fuel cell 271. Hot zone 270 can be enclosed with thermally insulating walls.

Flow control region 202 is in fluid communication with ambient intake air 216. Thus, a stream of flow control air 217 flows from blower 272 into flow control region 202 and keeps flow control region 202 as a relatively cool zone within exothermic apparatus 201. Air supply 217 provides a supply of intake air for fuel cell 271, as controlled by flow control electronics 290. Excess air blown into flow control region 202 will flow into hot zone 270, around fuel cell 271. This air helps cool the exterior of fuel cell 271 and hot zone 270 from becoming too hot.

Figure 3:
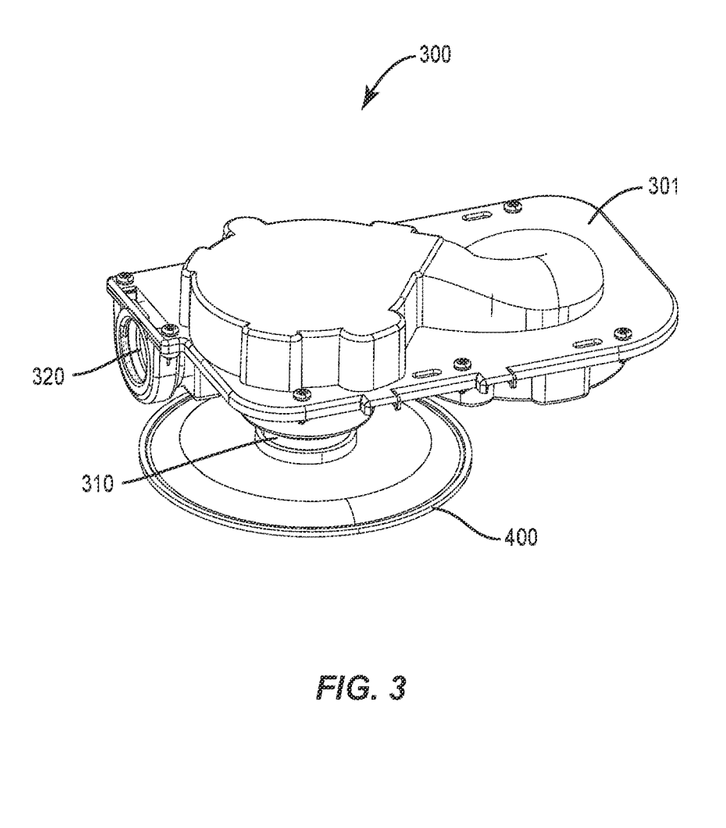
FIG. 3 is a bottom perspective view of an air blower and filter assembly in accordance with preferred embodiments of the invention.
Figure 4:
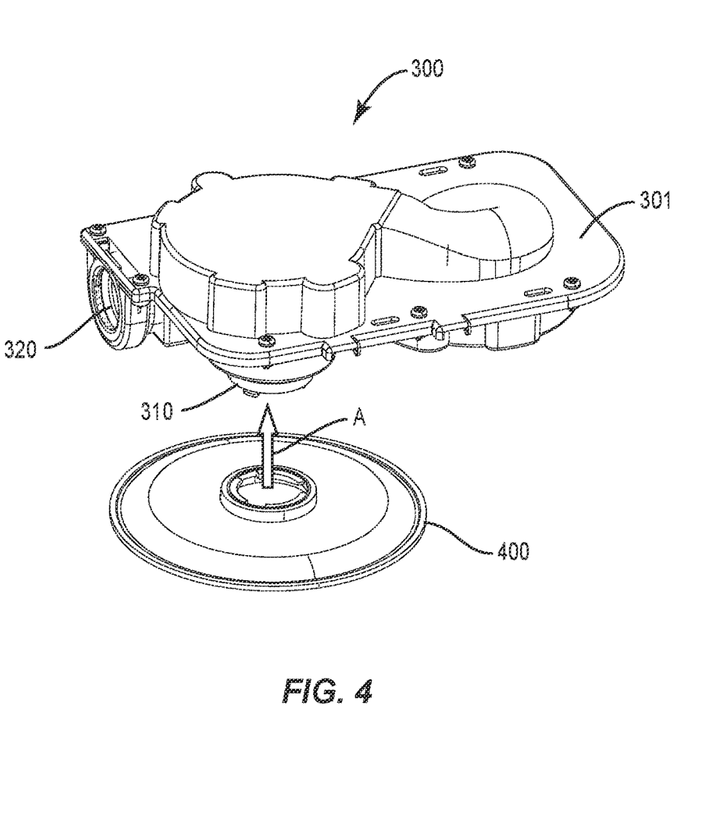
FIG. 4 is a bottom perspective view of the air blower and filter of FIG. 3, with the filter disassembled.

A dual fan blower 300 of blower assembly 350 is shown generally in FIGS. 3 and 4. Blower 300 includes a housing 301 with an axial intake 310 and a radial output 320. A filter 400 is shown attached to intake 310 in FIG. 3. Filter 400 is shown detached from intake 310 in FIG. 4. Filter 400 mates with intake 310 in the direction of an arrow A. Accordingly, any air fed to the fuel cell 271 can be filtered. A preferred filter meets the requirements for N95 certification.

Figure 5:
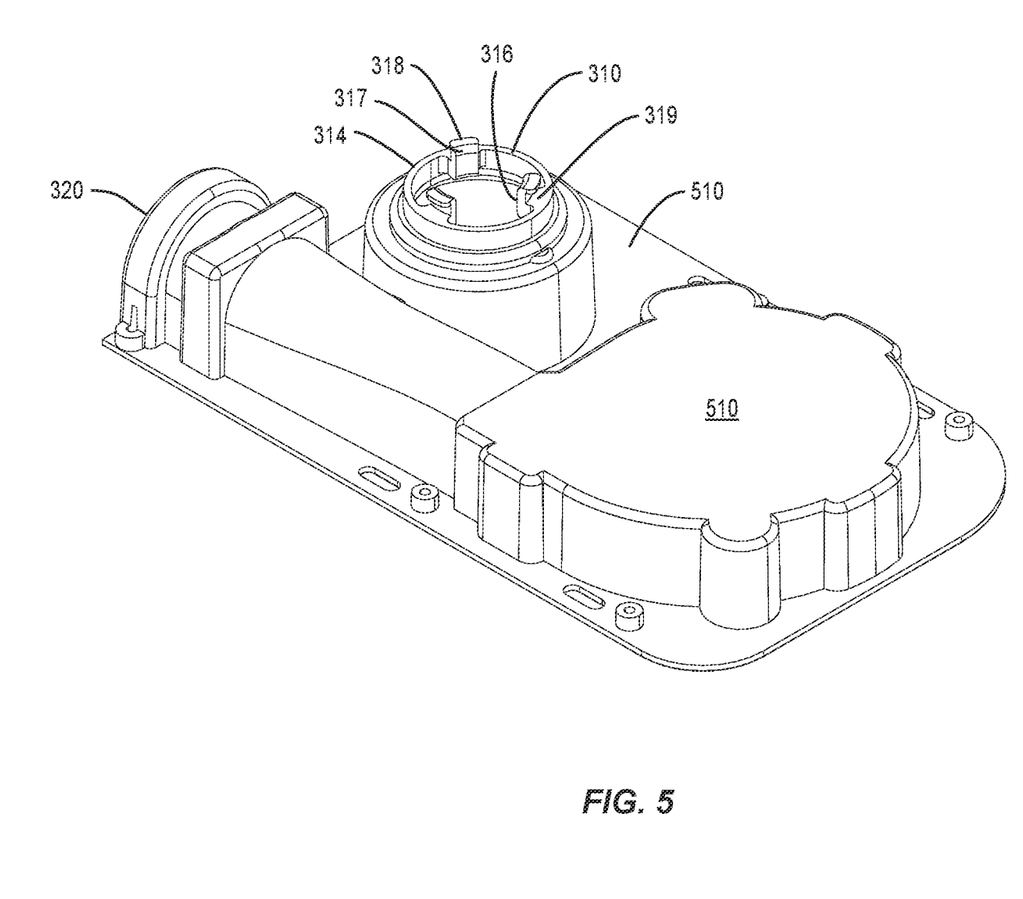
FIG. 5 is a top partial perspective view of a housing for the air blower and filter assembly of FIG. 3.
Figure 6:
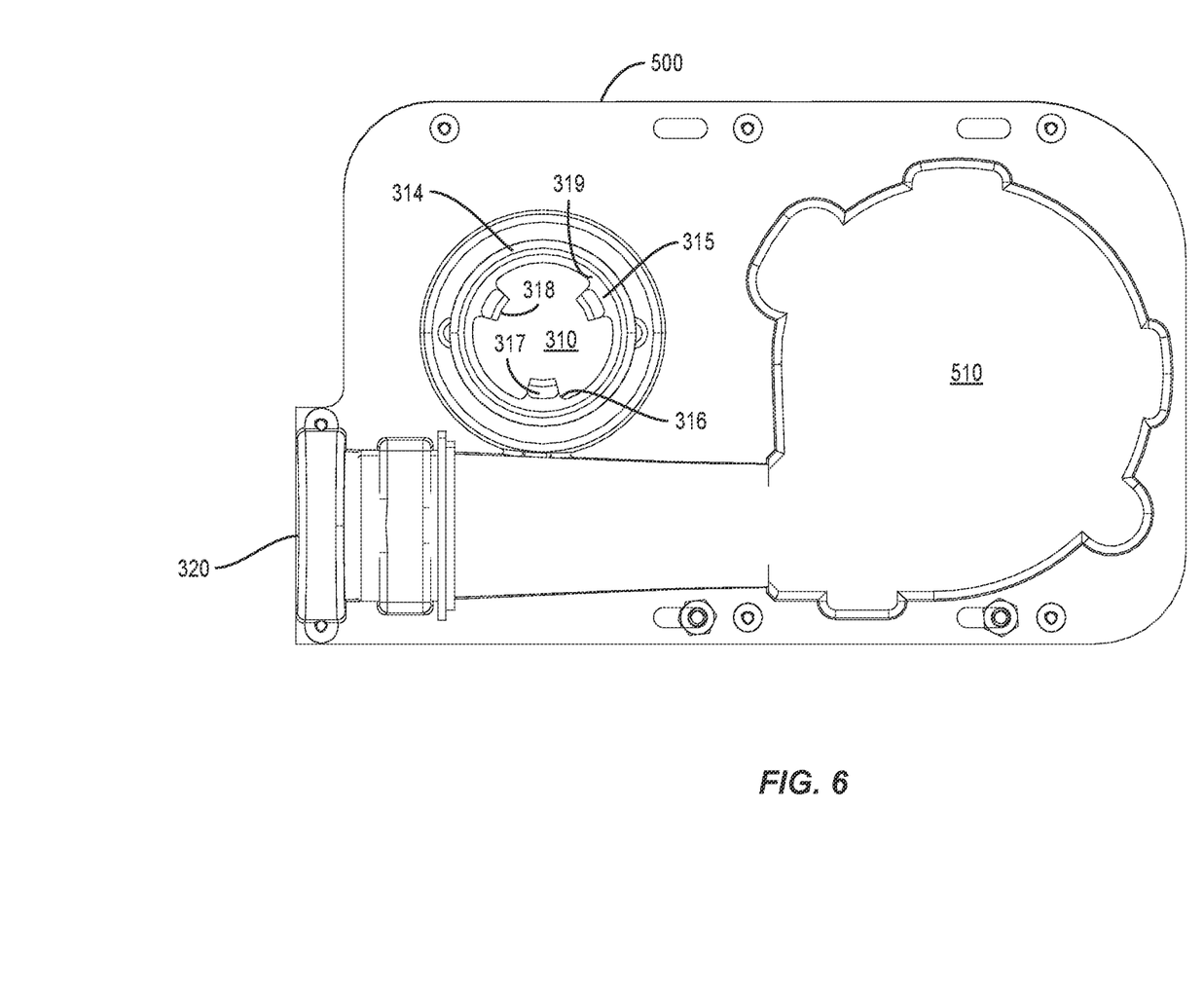
FIG. 6 is a top plan view of the housing portion of FIG. 5.
Figure 7:
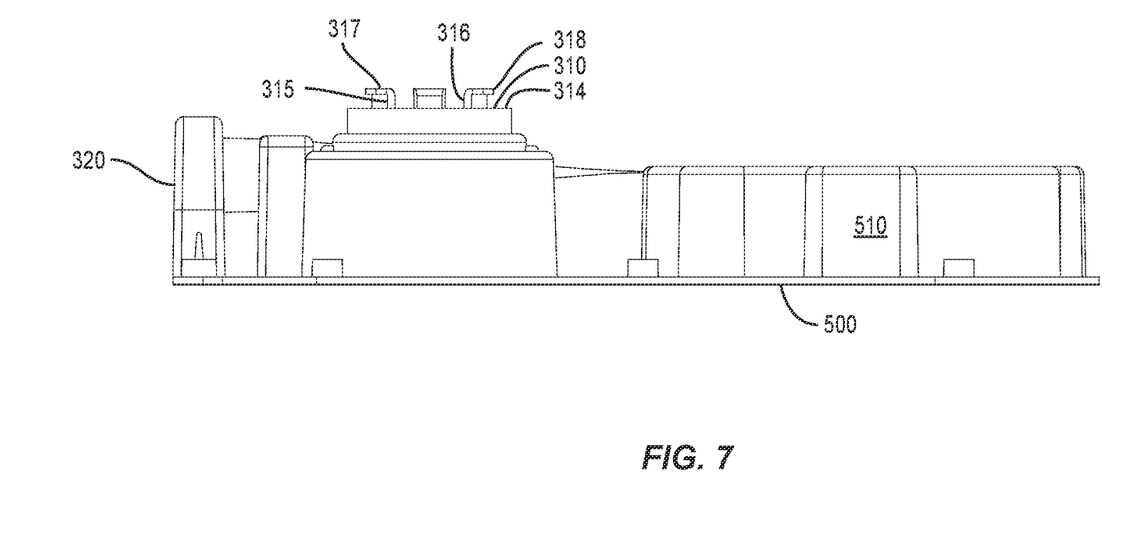
FIG. 7 is a side view of the housing portion of FIG. 5.

A top perspective view of a part of a blower housing 500 of blower 300 is shown in FIG. 5. A top plan view of housing 500 is shown in FIG. 6, and a side view of housing 500 is shown in FIG. 7. Housing 500 includes a fan region 510, for housing an electronically controlled fan (not shown) to draw air into intake 310 and blow the air out of outlet 320.

Inlet 310 is configured to releasably secure filter 400 thereto. Inlet 310 is circular, and has a plurality (three) of prongs 315 extending outward therefrom. Each prong 315 has a base 316 extending axially up from inlet 310, a smooth transition portion 317 and a hook portion 318 extending radially from transition portion 317. Each prong 315 is offset into the center of inlet 310 at a shelf 319. Because prongs 315 are offset into the center of inlet 310, inlet 310 can present an uninterrupted circular base 314 for an effective seal with filter 400.

Figure 8:
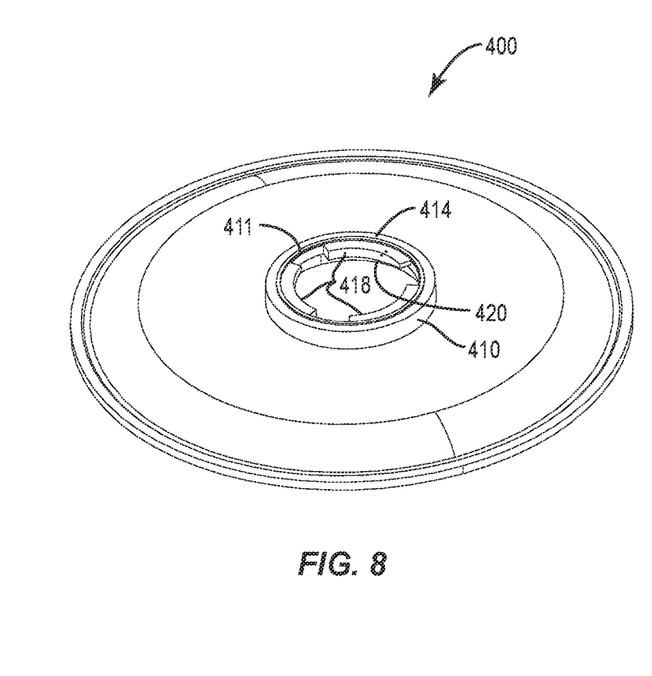
FIG. 8 is a bottom perspective view of the filter of FIG. 5.
Figure 9:
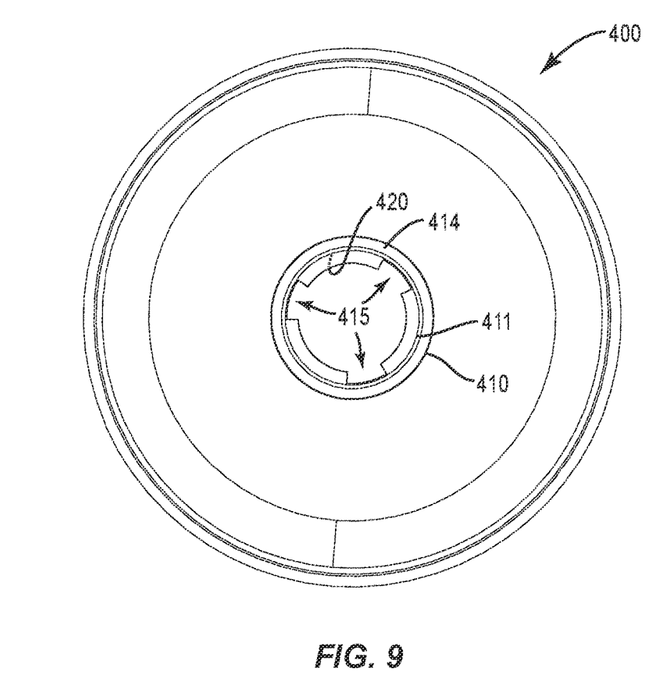
FIG. 9 is a bottom plan view of the filter of FIG. 8.
Figure 10:
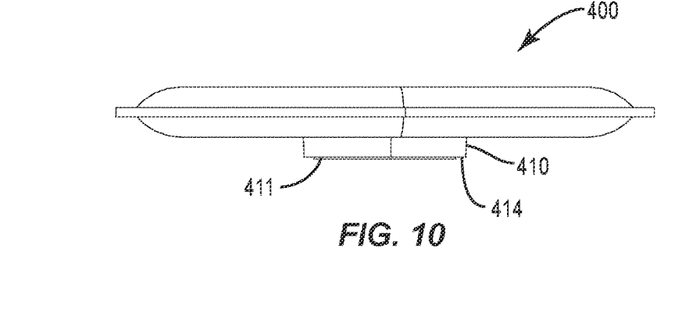
FIG. 10 is a side view of the filter of FIG. 8.

Filter 400 is shown in bottom perspective view, bottom plan view, and side view in FIGS. 8, 9, and 10, respectively. Filter 400 includes a central attachment portion 410, which extends axially from a bottom surface of filter 400. Attachment portion 410 includes a circular engagement shelf 414 for engaging with and sealing against base 314 of housing 500 of blower 300. Filter 400 also includes an engagement lip 411 which nests inside the inner surface of base 314, to help seal filter 400 against air inlet 310.

Central attachment portion 410 of filter 400 also includes a plurality (three) of engagement slots 415 for receiving the respective (e.g., 3) of prongs 315 of blower housing 500. Attachment portion 400 also includes a plurality (three) of camming ribs 418. To attach filter 400 to blower 300, attachment portion 410 is pressed up in the direction of arrow A (FIG. 4) against inlet 315. Filter 400 is then rotated radially, until hooks 318 of prongs 315 of housing 500 pass down through slots 415 of filter 400. An upper surface 420 of camming ribs 418 is inclined. A left end of each camming rib 418 is farther into the interior of filter 400, away from the surface of engagement shelf 414, than the right end. Therefore, after prongs 315 are inserted down through slots 415, filter 400 is rotated. This places the upwardly facing surface of hooks 318 against the thin/low downwardly facing surface of camming ribs 418. As filter 400 is further rotated, the engagement of the downward facing surface of lower surface 420 comes into tighter engagement with the upwardly facing surface of hooks 318, to tighten the engagement between engagement shelf 414 of filter 400 and base 314 of inlet 310 to provide an effective seal between filter 400 and inlet 310 of blower 300.

Filter 400 can be formed of any suitable filter material. It is preferably a two layer filter with space between the layers for increased surface area and therefore increased filter surface for airflow filtration into inlet 310. It is preferred that filter 400 conform to N95 certification standards. It is also preferred to construct filter 400 to keep a top and a bottom surface of filter 400 separated, so that air can be filtered through both the top and the bottom surface, before flowing into inlet 310.

Flow control electronics 290 includes sensors for measuring air flow. These sensors will be able to detect whether filter 400 becomes too clogged for adequate air flow and/or proper filtration. In this case, electronics 290 can activate a warning signal, such as a flashing light and/or audible signal. At this point, exothermic apparatus 201 can be shut down and filter 400 replaced. This can be effected by rotating filter 400 in the opposite direction, to slide hooks 318 towards slots for 15, whereby filter 400 can be removed from inlet 310 in the direction opposite arrow A.

Figure 13:
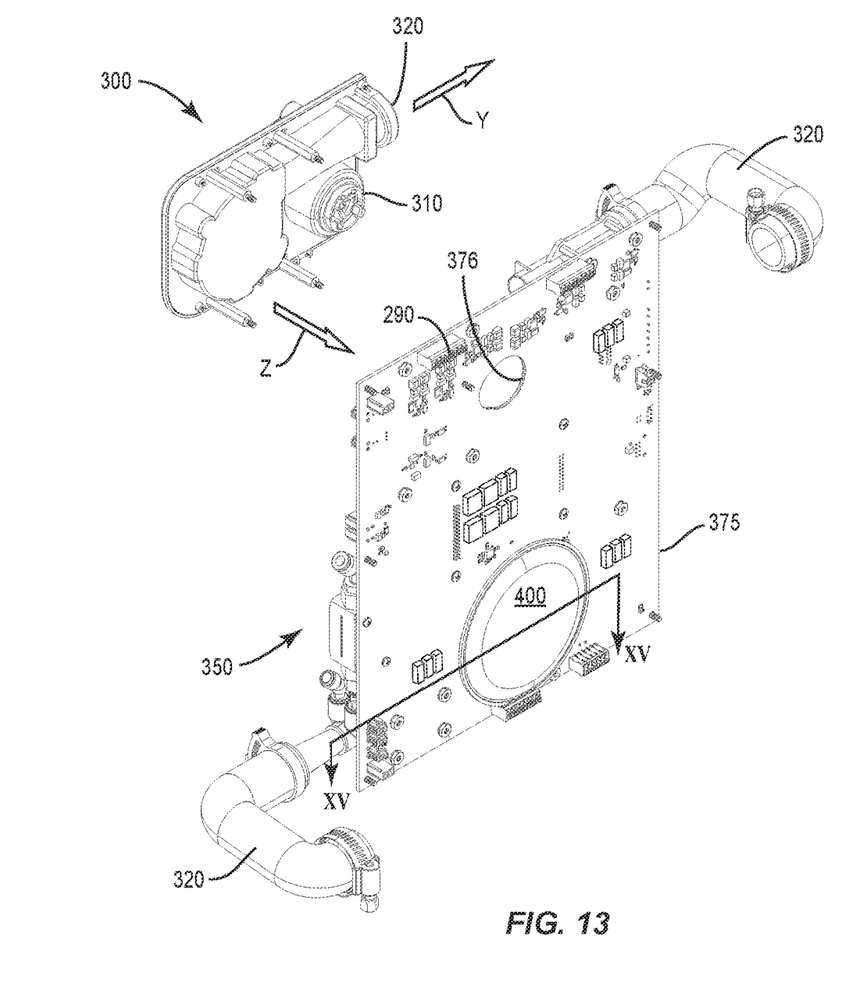
FIG. 13 is a partial exploded perspective top view of the assembly of FIG. 11.

The attachment of blower 300 to printed circuit board (PCB) 375 is depicted more clearly in FIG. 13. Circuit board 375 includes a hole 376 for receiving the axial intake 310 of blower 300. Blower 300 is mounted on board 375 in the direction of an arrow Z, with axial intake 310 inserted into hole 376. Then, filter 400 is attached to the exposed axial intake 310 extending through hole 376, to present a filtered air intake for the air received by blower 300 to supply filtered air to fuel cell 271, as controlled by flow control circuitry 290.

Figure 11:
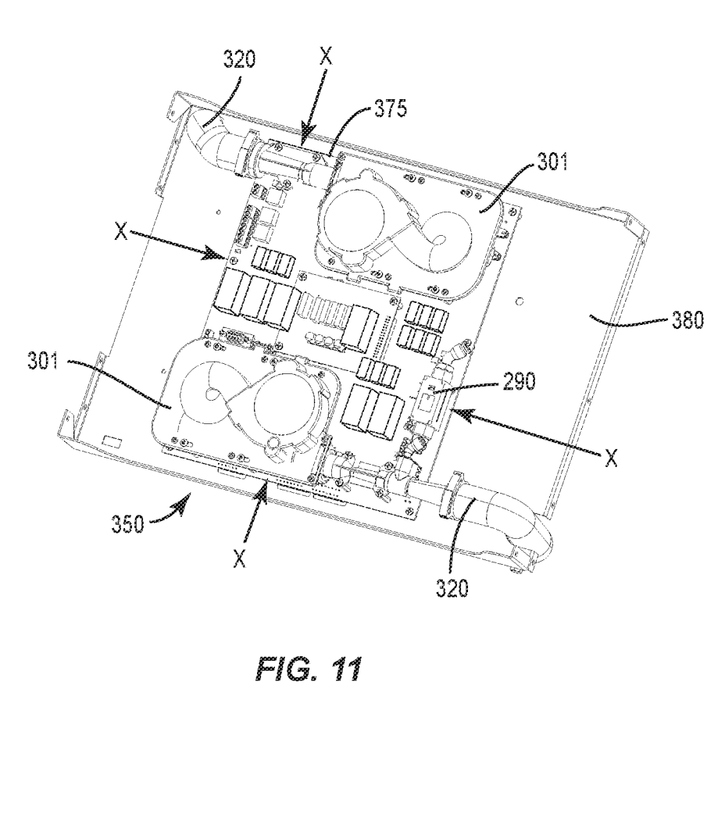
FIG. 11 is a bottom perspective view of a circuit board, filter, and air blower assembly, in accordance with preferred embodiments of the invention.
Figure 12:
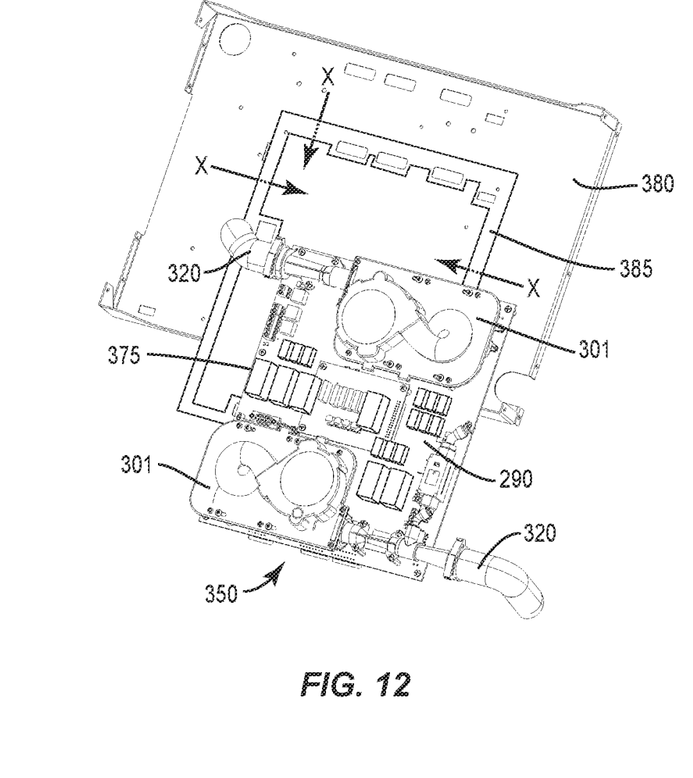
FIG. 12 is an exploded perspective view of the assembly of FIG. 11.

Referring to FIGS. 12 and 13, an assembly of blowers 300 and control circuitry 290 are mounted on circuit board 375. A BOP support panel 380 is used to mount PCB 375 within flow control region 202 of exothermic apparatus 201. FIG. 11 is a bottom perspective view of PCB 375 attached to support panel 380, with an exploded view in FIG. 12. An air filter gasket 385 is sandwiched between the top of PCB 375 and support panel 380. Support panel 380 is secured within flow control region 202. Air flows through filter gasket 385 in the direction of an arrow X. Filter gasket 385 permits airflow in the direction of arrow X to reach filter 400. If filter 385 is coarser than filter 400, it will prevent filter 400 from being clogged with larger particles than can be filtered out with filter gasket 385.

Figure 14:
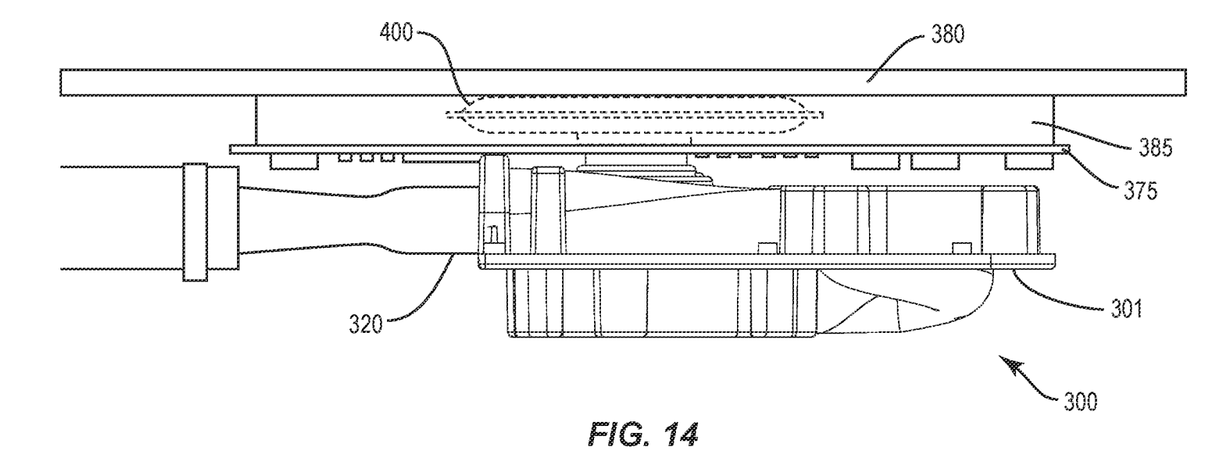
FIG. 14, is a partial side view of the circuit board, filter, and air blower assembly of FIG. 11.
Figure 15:
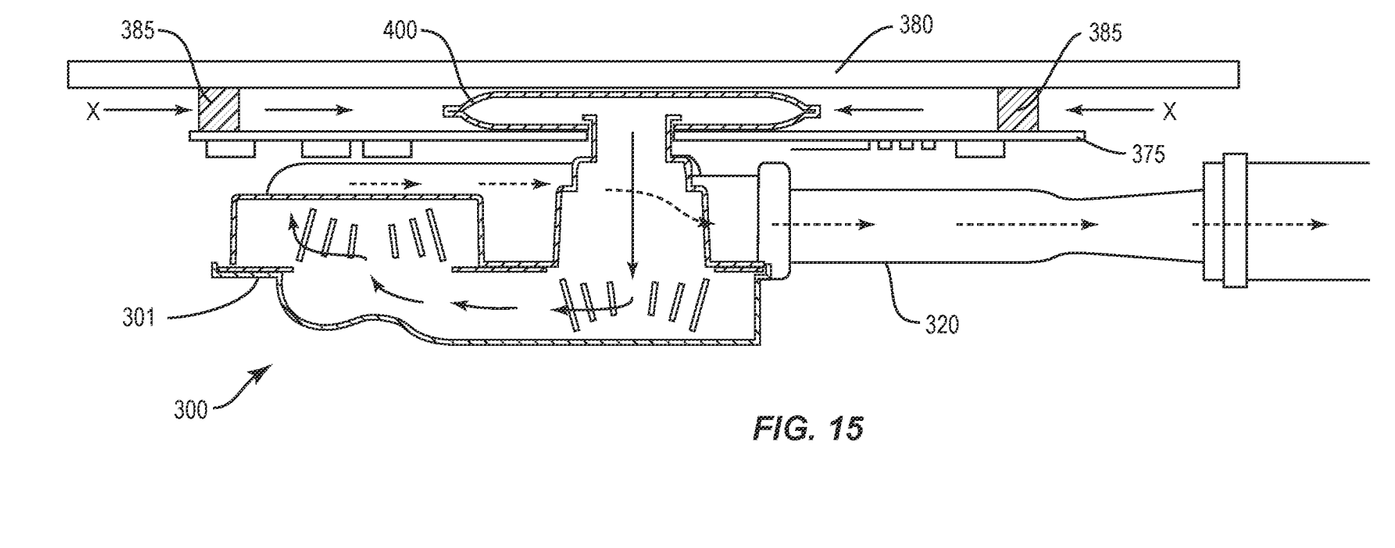
FIG. 15 is a partial cross sectional view of the circuit board, filter, and air blower assembly of FIG. 11, along line XV of FIG. 13.

Airflow through blower 300 is shown more clearly in FIGS. 14 and 15. Air from relatively cool flow control zone 202 is drawn by blower 300 through filter 385 in the direction of arrow X. Filter gasket 385 can act as a primary filter and retain the larger particles, to prevent those particles from reaching and clogging filter 400. This helps prolong the life of filter 400. After passing through filter 385, the air flows between panel 380 and board 375. Due to the narrow dimensions, the flow speed can be high, which helps keep board 375 cool. After passing between board 375 and panel 380, the air is drawn through filter 400. The gap between board 375 and panel 380 can be sized wider than the height of filter 400 to permit airflow both above and below filter 400, so that all of filter 400 can be used for filtration. After passing through blower 300, the air is directed through outlet 320 and eventually to fuel cell 271. Note that in certain embodiments of the invention, an N95 certified filter need not be used. In fact, certain embodiments of the invention can omit filter 400 and merely use filter gasket 385 around the outside edge of the PCB/plate interface.

Note that where this application has listed the steps of a method or procedure in a specific order, it may be possible, or even expedient in certain circumstances, to change the order in which some steps are performed, and it is intended that the particular steps of the method or procedure claim set forth herebelow not be construed as being order-specific unless such order specificity is expressly stated in the claims.

While the preferred embodiments of the devices and methods have been described in reference to the environment in which they were developed, they are merely illustrative of the principles of the inventions. Modification or combinations of the above-described assemblies, other embodiments, configurations, and methods for carrying out the invention, and variations of aspects of the invention that are obvious to those of skill in the art are intended to be within the scope of the claims.

What is claimed is:

1. A blower assembly, comprising:
   a circuit board having a front side, a rear side, and a hole therethrough;
   a blower unit having an axial intake and a radial output attached to the front side of the circuit board, with the intake extending through the hole, to the rear side of the circuit board;
   a filter attached to the axial intake, on the rear side of the circuit board; and
   the circuit board mounted to a support panel, with the rear side of the circuit board facing and parallel to the support panel, and a gasket is positioned around an exterior edge of the circuit board, between the circuit board and the support panel, the gasket constructed from filter material, and adapted to permit airflow through the gasket, to the filter attached to the axial intake.

2. The blower assembly of claim 1, wherein the circuit board is a printed circuit board.

3. The blower assembly of claim 1, wherein the filter attached to the axial intake is an air filter.

4. The blower assembly of claim 1, wherein filter attached to the axial intake satisfies N95 certification filter standards.

5. The blower assembly of claim 1, wherein the axial intake and radial output are part of a blower casing, and the blower unit comprises a centrifugal blower having an impeller disposed within the casing, the impeller and casing configured and adapted to draw a gaseous medium at a first pressure into the axial intake and expel the gaseous medium at a second higher pressure through the radial outlet; and a motor is mounted within the casing, the motor configured and adapted to drive the impeller.

6. The blower assembly of claim 5, and comprising a check valve mounted within the casing, positioned and adapted to permit airflow from the axial intake to the radial outlet, and prevent airflow from the radial outlet to the axial intake.

7. The blower assembly of claim 6, wherein the check valve comprises a flexible diaphragm attached to an inlet of the casing.

8. The blower assembly of claim 1, wherein:
   the blower unit comprises a series of blowers, each blower in the series comprising a blower casing having an axial inlet and a radial outlet, an impeller disposed within the casing for drawing a gaseous medium at a first pressure into the axial inlet and expelling the gaseous medium at a second higher pressure through the radial outlet, and a motor for driving the impeller; and each blower casing comprises a duct connecting the radial outlet of at least a first blower in the series of blowers with the axial inlet of a second blower in the series of blowers.

9. The blower assembly of claim 1, wherein a second blower unit is also attached to the front side of the circuit board, and a second air intake of the second blower unit extends through a second hole through the circuit board to the rear side of the circuit board, and a second filter is attached to the second air intake of the second blower unit on the rear side of the circuit board.

10. The blower assembly of claim 1, wherein the gasket is a primary filter, adapted to be a coarser filter than the filter attached to the axial intake, whereby particles that can be too small to be trapped by the primary filter will be trapped by the filter attached to the axial intake.

11. The blower assembly or claim 1, wherein the blower assembly is mounted within a fuel cell apparatus, and the radial outlet of the blower unit is coupled to the fuel cell apparatus, to provide air to the fuel cell apparatus.

12. The blower assembly of claim 11, wherein the radial outlet of the blower unit is coupled to an anode of the fuel cell apparatus and the outlet of a second blower unit is coupled to a cathode of the fuel cell apparatus.

13. The blower assembly of claim 10, wherein the blower assembly is adapted to supply air to a fuel cell apparatus and the circuit board contains electronic controls to control the speed of air flowing from the blower unit(s) to the fuel cell apparatus.

14. The blower assembly of claim 10, wherein the blower unit(s) are mounted in a flow control chamber, and ambient air is blown into the flow control chamber from a main fan, and the blower unit(s) draw in the air in the flow control chamber and blow the air into a fuel cell apparatus.

15. The blower assembly of claim 14, wherein the support panel is mounted in the flow control chamber.

16. A method of operating a fuel cell, comprising:
drawing ambient air into a flow control chamber;
drawing air from the flow control chamber into one or more blowers in the flow control chamber through an air filter gasket as a primary filter positioned between an assembly of a support panel and a circuit board mounted on the support panel with the air filter gasket therebetween, the one or more blowers mounted to the support panel and circuit board assembly;
wherein the air that passed through the air filter gasket is drawn through an air filter on an intake of the blower(s) positioned between the circuit board and the support panel, and then blowing the air that had been filtered through the air filter gasket and the air filter on the intake to the fuel cell.

17. The method of claim 16, and electronically controlling operation of the blower(s) with electronics on the circuit board.

18. The method of claim 17, wherein the fuel cell gives off heat to the circuit board, and the circuit board is cooled by the flow of ambient air in the flow control chamber.

19. An apparatus having a heat producing exothermic mechanism, comprising:
a housing having an exterior surface and an interior surface defining a housing interior, the housing having a front and rear, and a length from the front to the rear;
the exothermic mechanism having a top, bottom, front, rear and sides, mounted within a hot zone the housing interior;
an air intake conduit in fluid communication with a source of ambient air at an air inlet of the housing, the air intake conduit in fluid communication with a cool zone of the housing interior, the cool zone at a temperature below a temperature of the hot zone;
an air blower having an axial intake and a radial output attached to a front side of a circuit board mounted within the cool zone, with the axial intake extending through a hole in the circuit board to the rear side of the circuit board;
an air filter over the axial intake on a rear side of the circuit board;
the axial intake in fluid communication with the air intake conduit;
the exothermic mechanism having an air intake in fluid communication with the outlet of the blower;
the circuit board having an assembly of flow control electronics adapted to control the operation of the blower, to control the flow of air to the exothermic mechanism; and
a primary filter disposed on the circuit board upstream from the air filter, whereby air is first drawn through the primary filter before reaching the air filter over the axial intake, the primary filter being coarser than the air filter.

* * * * *